United States Patent
Kleven

(10) Patent No.: US 12,447,358 B2
(45) Date of Patent: Oct. 21, 2025

(54) PARTICLE BEAM GUIDING SYSTEM AND RELATED RADIOTHERAPY SYSTEM

(71) Applicant: PH Kleven AS, Kongsberg (NO)

(72) Inventor: Per Havard Kleven, Kongsberg (NO)

(73) Assignee: Kongsberg Beam Technology AS, Oslo (NO)

( * ) Notice: Subject to any disclaimer, the term of this patent is extended or adjusted under 35 U.S.C. 154(b) by 0 days.

(21) Appl. No.: 16/978,779

(22) PCT Filed: Mar. 11, 2019

(86) PCT No.: PCT/EP2019/056024
§ 371 (c)(1),
(2) Date: Sep. 8, 2020

(87) PCT Pub. No.: WO2019/175105
PCT Pub. Date: Sep. 19, 2019

(65) Prior Publication Data
US 2021/0046330 A1 Feb. 18, 2021

(30) Foreign Application Priority Data

Mar. 12, 2018 (SE) .................................. 1830083-0

(51) Int. Cl.
A61N 5/10 (2006.01)
G21K 1/093 (2006.01)
G21K 5/04 (2006.01)

(52) U.S. Cl.
CPC ............. *A61N 5/1067* (2013.01); *A61N 5/10* (2013.01); *A61N 5/1037* (2013.01);
(Continued)

(58) Field of Classification Search
CPC ...... A61N 5/10; A61N 5/1037; A61N 5/1039; A61N 5/1048; A61N 5/1049;
(Continued)

(56) References Cited

U.S. PATENT DOCUMENTS 4,726,046 A * 2/1988 Nunan ................. A61N 5/1081
378/65
6,512,813 B1 1/2003 Krispel et al.
(Continued)

FOREIGN PATENT DOCUMENTS

CN 102844820 12/2012
CN 103153397 6/2013
(Continued)

OTHER PUBLICATIONS

China patent office action and search report of Jan. 26, 2022.

*Primary Examiner* — Allen C. Ho
(74) *Attorney, Agent, or Firm* — Christian D. Abel

(57) ABSTRACT

A particle beam guiding system (1a, 1b, 1c) for receiving an incoming particle beam (6a, 6b, 6c) along an incoming trajectory (T1) and controlling an exit energy level and an exit trajectory (T3) of the particle beam, wherein the particle beam guiding system comprises an attenuator (22) for adjusting the energy level of the particle beam; a first beam guide (26) positioned downstream of the attenuator, comprising first and second guiding dipoles, each comprising two magnets for creating magnetic fields for deflecting the particle beam from the incoming trajectory into an intermediate trajectory (T2), wherein the first dipole of the first beam guide is arranged to deflect the particle beam in a first plane, and the second dipole of the first beam guide is arranged to deflect the particle beam in a second plane which is orthogonal to the first plane; and a second beam guide (28) positioned downstream of the first beam guide, comprising first and second guiding dipoles, each comprising two magnets for creating magnetic fields for deflecting the particle beam from the intermediate trajectory into the exit trajectory, wherein the first dipole of the second beam guide is arranged to deflect the particle beam in a first plane and the second dipole of the second beam guide is arranged to
(Continued)

deflect the particle beam in a second plane which is orthogonal to the first plane. A radiotherapy system comprising such particle beam guiding systems is also disclosed.

8 Claims, 5 Drawing Sheets

(52) U.S. Cl.
CPC ......... *A61N 5/1048* (2013.01); *A61N 5/1049* (2013.01); *A61N 5/1064* (2013.01); *A61N 5/1068* (2013.01); *A61N 5/1071* (2013.01); *A61N 5/1077* (2013.01); *A61N 5/1078* (2013.01); *A61N 5/1084* (2013.01); *G21K 1/093* (2013.01); *A61N 2005/1052* (2013.01); *A61N 2005/1054* (2013.01); *A61N 2005/1055* (2013.01); *A61N 2005/1058* (2013.01); *A61N 2005/1061* (2013.01); *A61N 2005/1072* (2013.01); *A61N 2005/1085* (2013.01); *A61N 2005/1087* (2013.01); *A61N 2005/1089* (2013.01); *A61N 2005/1095* (2013.01)

(58) Field of Classification Search
CPC .... A61N 2005/1052; A61N 2005/1054; A61N 2005/1055; A61N 2005/1058; A61N 2005/1061; A61N 5/1064; A61N 5/1065; A61N 5/1067; A61N 5/1068; A61N 5/1071; A61N 2005/1072; A61N 5/1077; A61N 5/1078; A61N 5/1084; A61N 2005/1085; A61N 2005/1087; A61N 2005/1089; A61N 2005/1095; G21K 1/08; G21K 1/093; G21K 5/04
USPC .................................. 378/64, 65; 250/492.3
See application file for complete search history.

(56) References Cited

U.S. PATENT DOCUMENTS

| | | | | |
|---|---|---|---|---|
| 6,710,362 | B2 * | 3/2004 | Kraft | A61N 5/1049 250/492.3 |
| 7,268,358 | B2 * | 9/2007 | Ma | G21K 5/04 250/492.23 |
| 7,378,672 | B2 * | 5/2008 | Harada | A61N 5/10 250/493.1 |
| 7,482,605 | B2 * | 1/2009 | Kraft | G21K 1/10 250/493.1 |
| 7,856,086 | B2 * | 12/2010 | Tanabe | H01J 35/112 378/138 |
| 7,919,759 | B2 * | 4/2011 | Furukawa | A61N 5/10 250/396 ML |
| 7,939,809 | B2 * | 5/2011 | Balakin | A61N 5/10 315/504 |
| 7,978,817 | B2 * | 7/2011 | Rietzel | A61N 5/1049 378/65 |
| 8,193,520 | B2 | 6/2012 | Pu | |
| 8,399,866 | B2 * | 3/2013 | Balakin | H05H 7/10 315/504 |
| 8,487,269 | B2 * | 7/2013 | Amies | G01R 33/385 250/397 |
| 8,525,133 | B2 * | 9/2013 | Pu | A61N 5/1043 250/398 |
| 8,575,564 | B2 * | 11/2013 | Iwata | G21K 1/10 250/492.3 |
| 8,598,546 | B2 * | 12/2013 | Bert | A61N 5/10 250/492.1 |
| 8,613,694 | B2 * | 12/2013 | Walsh | A61N 5/103 378/65 |
| 8,766,217 | B2 * | 7/2014 | Balakin | H05H 7/08 250/503.1 |
| 8,791,435 | B2 * | 7/2014 | Balakin | G21K 1/087 250/492.1 |
| 8,901,509 | B2 * | 12/2014 | Balakin | G21K 1/14 378/65 |
| 8,901,519 | B2 * | 12/2014 | Schardt | A61N 5/1043 250/397 |
| 8,933,415 | B2 * | 1/2015 | Kakutani | A61N 5/1077 250/423 P |
| 8,957,396 | B2 * | 2/2015 | Balakin | G21K 1/087 250/492.1 |
| 8,975,600 | B2 * | 3/2015 | Balakin | A61B 6/4092 250/492.1 |
| 9,012,866 | B2 * | 4/2015 | Benna | A61N 5/1077 250/397 |
| 9,061,144 | B2 * | 6/2015 | Fujii | A61N 5/1068 |
| 9,199,093 | B2 * | 12/2015 | Brusasco | A61N 5/1042 |
| 9,265,970 | B2 * | 2/2016 | Honda | A61N 5/1043 |
| 9,283,406 | B2 * | 3/2016 | Prieels | G21K 5/10 |
| 9,283,408 | B2 * | 3/2016 | Huber | A61N 5/1082 |
| 9,330,886 | B2 * | 5/2016 | Bert | A61N 5/1067 |
| 9,333,374 | B2 * | 5/2016 | Iwata | A61N 5/1077 |
| 9,539,442 | B2 * | 1/2017 | Goebel | H01J 47/02 |
| 9,550,077 | B2 * | 1/2017 | Tsoupas | H05H 7/10 |
| 9,586,058 | B2 * | 3/2017 | Bert | A61N 5/1043 |
| 9,731,146 | B2 * | 8/2017 | Rietzel | A61N 5/103 |
| 9,737,731 | B2 * | 8/2017 | Balakin | G21K 1/093 |
| 9,855,445 | B2 * | 1/2018 | Mansfield | A61N 5/1049 |
| 9,860,969 | B2 * | 1/2018 | Okazaki | A61N 5/1077 |
| 9,889,319 | B2 * | 2/2018 | Sakamoto | A61N 5/1067 |
| 9,931,522 | B2 * | 4/2018 | Bharadwaj | H05H 9/048 |
| 10,004,920 | B2 * | 6/2018 | Aoki | A61N 5/1081 |
| 10,070,510 | B2 * | 9/2018 | Krier | H05H 7/001 |
| 10,086,214 | B2 * | 10/2018 | Balakin | A61N 5/1044 |
| 10,183,176 | B2 * | 1/2019 | Kuhn | A61N 5/1031 |
| 10,252,083 | B2 * | 4/2019 | Clayton | A61N 5/1067 |
| 10,413,755 | B1 * | 9/2019 | Sahadevan | A61N 5/1084 |
| 10,548,212 | B2 * | 1/2020 | Aoki | H05H 13/04 |
| 10,661,100 | B2 * | 5/2020 | Shen | A61N 5/1075 |
| 10,661,101 | B2 * | 5/2020 | Sakamoto | A61N 5/1031 |
| 10,751,554 | B2 * | 8/2020 | Penfold | A61N 5/1077 |
| 10,751,555 | B2 * | 8/2020 | Raymond | A61B 6/032 |
| 10,828,514 | B2 * | 11/2020 | Kleven | A61N 5/1067 |
| 10,857,389 | B2 * | 12/2020 | Song | H05H 13/04 |
| 10,881,881 | B2 * | 1/2021 | Nonaka | G21K 5/04 |
| 11,000,696 | B2 * | 5/2021 | Elgart | A61N 5/1043 |
| 11,000,705 | B2 * | 5/2021 | Lee | G21K 5/10 |
| 11,110,299 | B2 * | 9/2021 | Schippers | A61N 5/1045 |
| 11,141,608 | B2 * | 10/2021 | Cavuto | G21K 5/04 |
| 11,235,171 | B2 * | 2/2022 | Wulff | A61N 5/1031 |
| 11,648,420 | B2 * | 5/2023 | Balakin | A61N 5/1082 600/427 |
| 11,918,830 | B2 * | 3/2024 | Michaud | A61B 6/4092 |
| 11,918,831 | B2 * | 3/2024 | Michaud | A61N 5/1077 |
| 11,925,818 | B2 * | 3/2024 | Michaud | A61N 5/1044 |
| 2003/0136924 | A1 | 7/2003 | Kraft et al. | |
| 2005/0029471 | A1 | 2/2005 | Kraft et al. | |
| 2007/0034812 | A1 | 2/2007 | Ma et al. | |
| 2008/0267349 | A1 | 10/2008 | Rietzel | |
| 2009/0279662 | A1 | 11/2009 | Rietzel | |
| 2013/0237822 | A1 | 9/2013 | Gross et al. | |
| 2016/0314929 | A1 | 10/2016 | Drees et al. | |

FOREIGN PATENT DOCUMENTS

| | | |
|---|---|---|
| CN | 104008942 | 8/2014 |
| EP | 1741469 A1 | 1/2007 |
| EP | 2146354 A1 | 1/2010 |
| EP | 2579265 | 4/2013 |
| EP | 2586494 | 5/2013 |
| EP | 2868347 A1 | 5/2015 |
| GB | 2551892 | 1/2018 |
| JP | 2007307223 | 11/2007 |
| WO | WO06/094533 A1 | 9/2006 |
| WO | WO2008/106496 A1 | 9/2008 |
| WO | WO08/116535 A1 | 10/2008 |

* cited by examiner

PARTICLE BEAM GUIDING SYSTEM AND RELATED RADIOTHERAPY SYSTEM

TECHNICAL FIELD

The present invention relates to a particle beam guiding system for receiving an incoming particle beam along an incoming trajectory and controlling an exit energy level and an exit trajectory of the particle beam. The present invention also relates to a method of controlling, in a particle beam guiding system, an exit energy level and an exit trajectory of a particle beam.

The present invention also relates to radiotherapy and more specifically how to increase the effect of radiation with the goal of destroying DNA of cells in a cancer tumour with minimum damage inflicted on surrounding tissue. In particular, the present invention relates to a radiotherapy system comprising a plurality of particle beam guiding systems, each particle beam guiding system being arranged for receiving an incoming particle beam along an incoming trajectory and controlling an exit energy level and an exit trajectory of the particle beam towards a three-dimensional radiation target located inside the body of a radiotherapy patient.

BACKGROUND

Cancer treatment using radiotherapy involves applying ionising radiation to a patient so that radiation energy is deposited in malignant cells of the patient's body. If sufficient amount of energy is deposited, disruption of DNA and the subsequent death of the radiated cells result.

Protons and other charged particles display a depth-dose curve which is suitable for radiation therapy. Such radiation produces a so-called Bragg peak—a sharp increase in the deposited energy in the very last region of the trajectory of the charged particle—where charged particle loses its whole energy and the deposited dose falls to zero.

US 2016/0144201 A1 discloses a system for intensity-modulated proton therapy in which multiple proton beams are delivered to a patient from multiple directions and angles. The system can control, configure, or select energy distributions of the proton beams, and also dynamically change the positions and/or alignments of the beams.

US 2016/0144201 A1 also discloses method of creating a proton treatment plan comprising the steps of dividing volumes of interest into sub-volumes, applying dose constraints to the sub-volumes based on, inter alia, patient movement, finding one or more feasible configurations of the proton therapy system, and selecting a proton beam configuration that improves or optimizes one or more aspects of the proton therapy.

However, a problem associated with the proton therapy system of US 2016/0144201 A1, and other prior art radiotherapy systems, is that patient movement during treatment makes it difficult for the system to accurately deliver the radiation dose to the intended position within the radiation target. In fact, even if the patient is restrained, organ movements within the patient's body will still make it difficult for prior art radiation therapy systems to accurately deliver the radiation dose, as will motions resulting from breathing and involuntary muscular activity, e.g. heart beats.

Therefore, when preparing a treatment plan using prior art systems, dose constraints need to take into account the uncertainty associated with patient and/or organ movements during treatment. In practise, this uncertainty may result in that the operator of the system sets the system to deliver a lower overall dosage to avoid damaging healthy tissue. This, in turn, may result in a less efficient therapy than if the uncertainty did not exist.

In a particle beam radiotherapy system, the particles travel at a speed which is near the speed of light and the trajectory is normally controlled and curved by magnets. It is challenging to change the direction of a particle beam in a fast and flexible manner as a consequence of the magnetic force required.

An object of the present invention is to mitigate this problem and provide a particle beam guiding system and a radiotherapy system which allow the energy and the trajectory of a particle beam to be controlled efficiently.

SUMMARY

According to one aspect the present invention provides a particle beam guiding system comprising:
an attenuator for adjusting the energy level of the particle beam;
a first beam guide positioned downstream of the attenuator, comprising first and second guiding dipoles, each comprising two magnets for creating magnetic fields for deflecting the particle beam from the incoming trajectory into an intermediate trajectory, wherein the first dipole of the first beam guide is arranged to deflect the particle beam in a first plane, and the second dipole of the first beam guide is arranged to deflect the particle beam in a second plane which is orthogonal to the first plane;
a second beam guide positioned downstream of the first beam guide, comprising first and second guiding dipoles, each comprising two magnets for creating magnetic fields for deflecting the particle beam from the intermediate trajectory into the exit trajectory, wherein the first dipole of the second beam guide is arranged to deflect the particle beam in a third plane and the second dipole of the second beam guide is arranged to deflect the particle beam in a fourth plane which is orthogonal to the third plane; and
a beam trajectory monitoring and control unit positioned downstream of the second beam guide and arranged for controlling the intended exit trajectory, wherein the beam trajectory monitoring and control unit comprises first and second beam trajectory control disks of a particle beam attenuating material, each being individually movable in individual, parallel planes which are orthogonal to the incoming trajectory, and each displaying an opening, the alignment of which openings defines the intended exit trajectory.

Said third plane may be the same as said first plane and, consequently, said fourth plane may be the same as said second plane.

The gap between the first and second beam guides may be within the range of 30 to 150 cm.

The particle beam guiding system may comprise a focusing unit positioned downstream of the attenuator and upstream of the first beam guide, comprising a set of magnets forming focusing quadrupoles for focusing the particle beam.

According to another aspect the present invention provides a method of controlling, in a particle beam guiding system, an exit energy level and an exit trajectory of a particle beam, the method comprising the steps of:
receiving, in the particle beam guiding system, an incoming particle beam along an incoming trajectory;

adjusting the energy level of the particle beam in an attenuator of the particle beam guiding system;

deflecting the particle beam from the incoming trajectory into an intermediate trajectory using a first beam guide of the particle beam guiding system positioned downstream of the attenuator, the first beam guide comprising first and second guiding dipoles, each comprising two magnets for creating magnetic fields for deflecting the particle beam from the incoming trajectory into the intermediate trajectory, wherein the first dipole of the first beam guide is arranged for deflecting the particle beam in a first plane, and the second dipole of the first beam guide is arranged for deflecting the particle beam in a second plane which is orthogonal to the first plane;

deflecting the particle beam from the intermediate trajectory into the exit trajectory using a second beam guide of the particle beam guiding system positioned downstream of the first beam guide, the second beam guide comprising first and second guiding dipoles, each comprising two magnets for creating magnetic fields for deflecting the particle beam from the intermediate trajectory into the exit trajectory, wherein the first dipole of the second beam guide is arranged for deflecting the particle beam in a third plane and the second dipole of the second beam guide is arranged for deflecting the particle beam in a fourth plane which is orthogonal to the third plane; and controlling the intended exit trajectory using a beam trajectory monitoring and control unit of the particle beam guiding system positioned downstream of the second beam guide, wherein the beam trajectory monitoring and control unit comprises first and second beam trajectory control disks of a particle beam attenuating material, each being individually movable in individual, parallel planes which are orthogonal to the incoming trajectory, and each displaying an opening, the alignment of which openings defines the intended exit trajectory.

The method may comprise the step of focusing the particle beam using a focusing unit of the particle beam guiding system positioned downstream of the attenuator and upstream of the first beam guide, wherein the focusing unit comprises a set of magnets forming focusing quadrupoles for focusing the particle beam.

The step of adjusting the energy level of the particle beam in the attenuator may comprise the step of moving a pair of sliding wedges in the attenuator towards or away from each other in order to increase or decrease the amount of attenuating material in the path of the particle beam.

In operation, the first and second beam trajectory control disks are positioned so that the openings define a desired exit trajectory of the particle beam guiding system. If the first and second beam guides have succeeded in achieving the desired or set exit trajectory, the particle beam will pass through the aligned openings in the control disks. However, stray particles not being perfectly aligned with the particle beam will caught by the control disks. Also, if the beam guides have misaligned the particle beam, the particle beam will hit the first or second control disk.

The first and/or the second beam trajectory control disk may advantageously comprise sensors capable of detecting where on the control disk the particle beam strikes, thus allowing information on the misalignment to be fed back to the particle beam guiding system allowing it to adjust, in real time or in near real time, the attenuator and/or the beam guides to reduced deviation between desired and detected exit trajectory.

In order to safeguard sufficient accuracy, the distance between the parallel first and second beam trajectory control disks may be within the range of 40 to 150 mm, and the openings displayed in the disks may be circular and have a diameter within the range of 3 to 10 mm.

The attenuator may comprise a pair of sliding wedges which can be moved towards or away from each other in order to increase or decrease the amount of attenuating material in the path of the particle beam. However, in principle any type of particle beam attenuator known within the art can be used.

The magnets of the first and second beam guides may be superconductive magnets.

The particle beam guiding system may advantageously comprise a chamber in which the components of the particle beam guiding system is enclosed. The chamber may advantageously provide atmospheric control, e.g. a vacuum enclosure and/or temperature control, e.g. to ensure cryogenic cooling. The chamber may also provide magnetic shielding, e.g. to prevent the magnetic fields from one particle beam guiding system from interfering with the operation of another particle beam guiding system.

The chamber of the particle beam guiding system may be generally tube shaped, having a first, particle beam inlet end facing away from the radiation target, and a second, particle beam exit end facing towards the radiation target.

According to a further aspect the present invention provides a radiotherapy system comprising:

a plurality of particle beam guiding systems sources, each particle beam guiding system being arranged for receiving an incoming particle beam along an incoming trajectory and controlling an exit energy level and an exit trajectory of the radiate particle beam on towards a three-dimensional radiation target located inside the body of a radiotherapy patient;

an imaging system arranged to monitor the position and orientation in space of the three-dimensional radiation target, including direction and speed of any movement of the radiation target, and also to monitor tissue characteristics of body tissue surrounding the radiation target located in the radiation paths of the particle beams;

a particle beam control system which, during a radiation treatment session:
  receives information on the position and orientation of the radiation target and on said tissue characteristics from the imaging system;
  based on the received information on said tissue characteristics, identifies body tissue which shall not be exposed to the particle beams; and
  in response to movement of the radiation target, controls the particle beam guiding systems so that:
    (i) Bragg peaks of the particle beams are brought to intersect in a predetermined beam intersect region inside the radiation target; and
    (ii) the radiation paths of the particle beams do not travel through said body tissue identified as not to be exposed to the particle beams.

Consequently, this aspect of the invention is based on using a particle beam control system to simultaneously and in a coordinated fashion operate a plurality of particle beam guiding systems. The particle beam control system is arranged to control the exit energy levels and the exit trajectories of the particle beams so that they intersect and present their Bragg peaks in a predetermined beam intersect region within a radiation target, e.g. a cancer tumour, while simultaneously preventing the particle beams from traveling through body tissue which has been identified as not to be exposed to the particle beams.

Prior to a treatment session, a treatment plan is established stating the required irradiation dose to be delivered to each part or region of the radiation target, as well as the radiation dose to be delivered to the radiation target from different directions. The treatment plan is typically created based on a detailed visualization of the radiation target and surrounding tissue, e.g. organs, bones and other tissue structures. The treatment plan typically also identifies body tissue and/or regions within the patient's body which are not to be exposed to the particle beams.

During a treatment session, the exit energy levels and the exit trajectories of the particle beams are adjusted in response to movement of the radiation target and/or movement of the surrounding tissue to find, at every point in time, a radiation path or trajectory of each particle beam that presents the Bragg peak in the intended beam intersect region while avoiding sensitive regions or structures in the patient's body which, e.g. according to a treatment plan, shall not be exposed to the particle beam (e.g. structures of the central and/or peripheral nervous system, eyes, organs identified not to be irradiated etc.) and/or regions or structures within the patient's body which may have unwanted effects on the particle beam (e.g. bones). If a suitable particle beam trajectory cannot be found for a particle beam source, the particle beam source may temporarily be shut down.

Movement of the radiation target and/or movement of the surrounding tissue prompting repositioning and realignment of the particle beam sources may typically be due to the patient moving or due to movement of internal organs of the patient.

If the radiation target is large, the treatment plan may call for the beam intersect region to be swept across the radiation target. Consequently, the exit energy levels and the exit trajectories of the particle beams of each particle beam may then be adjusted to effectuate such a sweeping action.

The particle beam control system may be arranged to update setpoint values for the exit energy level and the exit trajectory, and to send control signals to said plurality of particle beam guiding systems to effectuate the setpoint values, at a predetermined interval, e.g. at an interval within the range of 0.1 to 0.05 seconds.

The imaging system may comprise an X-ray computed tomography (X-ray CT) imaging system, a magnetic resonance imaging (MRI) system, a proton computed tomography (PCT) imaging system, a positron emission tomography (PET) system, an ultrasound imaging system or any other type of imaging system, or combination thereof, capable of providing a basis for a real time, or a near-real time, representation of the intended target and tissue surrounding the intended target which is located in the radiation paths of the particle beams.

The real time, or a near-real time, representation of the target and surrounding tissue may be based on a static representation of the target and surrounding tissue and on knowledge of motion patterns together with tracking of motion to align and update the representation in real time. The real time tracking of motion can be accomplished by the use of ultrasound or other already known means, e.g. as is disclosed in U.S. Pat. No. 5,207,223 and WO 02/19908 A1.

Based on said representation provided by the imaging system, the exit energy levels and the exit trajectories of the particle beam guiding systems can be adjusted to dynamically compensate for movements of the radiation target and surrounding tissue so that the Bragg peaks of the particle beams are maintained intersecting in the predetermined beam intersect region inside the radiation target, while at the same time establishing radiation paths of the particle beams which do not travel through body tissue identified as not to be exposed to the particle beams. In this way a more efficient dose delivery can be achieved, thus improving the effect of the radio therapeutic treatment inside the tumour and, at the same time, reducing the radiation dose delivered to surrounding, healthy tissue.

Due to the capability of the particle beam guiding systems to adjust the exit energy levels and the exit trajectories of the particle beams, the system according to the invention can be used to treat large tumours by sweeping the beam intersect region across the tumour while simultaneously compensating for movements of the radiation target and surrounding tissue. Due to the same capability, the system according to the invention can also be used to treat a plurality of tumours during a treatment session.

The system according to the invention can be used to document, electronically and in real time, a complete treatment session, e.g. document the accumulated radiation dose in each part of the target or targets and the system set-up used during the treatment session.

The radiotherapy system according to the invention may comprise one or more particle generators or accelerators for producing the particle beams and providing them to the particle beam guiding systems, each of which accelerators may be configured to generate one or more particle beams or beamlets.

The particle beams may be proton beams.

In the following, the term "particle beam" is understood to mean one or a plurality of particle beams or beamlets emerging from one and the same particle source and having the same beam path, unless otherwise stated or implicitly understood from the context. For example, the particle beam may be of the type which is referred to within the industry as a "pencil beam". Alternatively, an existing, new technology for real-time adjustment of the contour of a particle beam can be applied. This new technology is called image-guided radiation therapy (IGRT) or four-dimensional radiation therapy.

If the particle beam is a proton beam, the trajectory of the particle beam is normally manipulated by permanent magnets or electromagnets, and there will normally be large demands on power delivery and cooling in such an actuator system. For example, cooling may be required for energy transport or to provide conditions for superconductivity.

By individually controlling the exit energy levels and the exit trajectories of the particle beams the particle beam control system ensures that the Bragg peaks are focused in the beam intersect region.

The particle beam control system may be configured to control the start and stop of individual particle beams, and also the length in time during which each particle beam irradiates the beam intersect region.

The particle beam control system may control the particle beams in such a way that the volume in space occupied by the beam intersect region is relatively large, in which case the beam intersect region may encompass the entire radiation target, at least if the radiation target is small. Alternatively, the particle beam control system may be arranged to focus the particle beams such that the volume occupied by the beam intersect region becomes small, in which case the delivered radiation is concentrated to this small volume.

If the radiation target is larger than the volume occupied by the beam intersect region, the beam intersect region may be brought to swept or scan over the radiation target to deliver the desired irradiation dose to different parts of the radiation target. Such sweeping or scanning may be stepwise or continuous.

In order to dynamically control the beam intersect region, the exit energy levels and the exit trajectories of each particle beam should advantageously be controlled dynamically.

The objective of adjusting the exit energy levels and the exit trajectories of the particle beams is to secure an exact positioning of the occurrence of the Bragg peak of each particle beam, so that it occurs exactly in the pre-defined beam intersect region, i.e. so that the Bragg peaks of the particle beams are brought to intersect in the beam intersect region. The extent of the beam intersect region is generally determined by the cross-sectional areas of the intersecting particle beams and the axial extent of their Bragg peaks. If the Bragg peak is defined as the region where deposited energy is more than 80% of maximum deposited energy, the volume of the beam intersect region can typically be set to be within the range of 50 to 1000 $mm^3$, depending on the individual cross-sectional areas of the particle beams and the angles between the particle beams.

The position of individual particle beams in the beam intersect region should normally be set to be within an accuracy of +/−0.5 mm, and in order to provide sufficient dynamic properties, the adjustment of the exit trajectory of the particle beams should preferably be sufficiently fast to allow the particle beams to follow the beam intersect region moving at speed of 20 mm/s and accelerating at an acceleration of 40 $mm/s^2$.

The imaging system is arranged to continuously monitor the position and orientation in space, i.e. attitude, of the target as well as velocity data, i.e. data on changes in the position and attitude of the target. The imaging system is also arranged to monitor tissue surrounding the target, in particularly information on the tissue lying in the path of the particle beams.

Based on this data, the imaging system can dynamically map the tumour and the surrounding tissue and construct a mathematical model representing the relevant part of the patient's body. Different types of tissue (bone, flesh, organs, tumour etc.) will be mapped and using information on how the different types of tissue interact with the particle beams, the particle beam control system will be able to continuously adjust the exit energy level and the exit trajectory of each particle beam, so that the beam intersect region is locked to the intended position. The set-up of the desired exit energy levels and the desired exit trajectories, may advantageously be mapped using the same mathematical model, so that the actual real time irradiation as well as the accumulated effect in different parts of the body are registered, e.g. in each cubic mm (or per larger or smaller units, as chosen).

The information monitored by the imaging system is forwarded to the beam control system which processes the information and automatically calculates and implements, dynamically, the optimum combination of beam source positions, beam source alignments and beam modulations to focus and maintain the beams on the beam intersect region.

When the beam intersect region is moving, e.g. when the beam intersect region in intended to sweep over the target and/or when the beam intersect region is to follow the target when the target is moving, e.g. due to breathing motion, it will sometimes be necessary to dynamically adjust the exit energy level and the exit trajectory of individual particle beams in order for the trajectories of the beams to avoid bone, such as ribs, as bone has a different and normally unwanted effect on the particle beam.

Adjusting the exit energy level of a particle beam may comprise applying a range shifter so that the distal position of the Bragg peak can be controlled to occur in the beam intersect region, e.g. as is described in PCT/US2008/055069, which is hereby incorporated by reference.

The energy loss for a beam of charged particles varies substantially, as measured per millimetre, depending upon the category of tissue it will pass through before reaching the beam intersect region in the target. Whether it will pass through air, flesh, various organs, or bone tissue, and the path distance of each of these, will have a profound effect on at which distance from the beam source the Bragg peak will occur.

Taking into account the relevant type of particles in the particle beams and other relevant beam characteristics, the mathematical model of the target and surrounding tissue can be furnished with data showing energy loss per mm per category of tissue. In this respect, 3D dose tracking may be applied, e.g. as is described in U.S. Pat. No. 9,199,093, which is hereby incorporated by reference.

In the following, the invention will be discussed in more detail with reference to the appended drawings.

DETAILED DESCRIPTION

When a charged particle moves through matter, it ionizes atoms of the material and deposits a dose along its path. As the velocity of the charged particle decreases, the deposited energy increases. For protons, a-rays, and other ion rays, the deposited energy peaks immediately before the particles come to rest and, consequently, if the energy loss of such ionizing radiation is plotted as a function of distance travelled through matter, the resulting curve will display a pronounced peak, as so-called Bragg peak, immediately before the deposited energy becomes zero.

Figure 1:
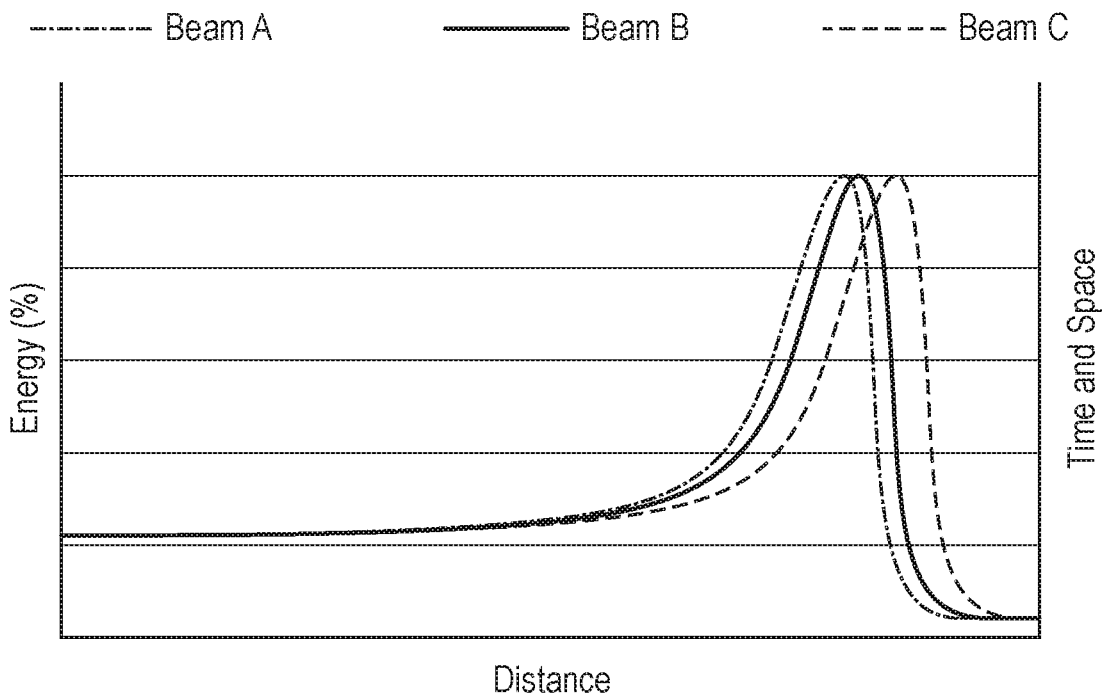
FIG. 1 illustrates Bragg peaks of three different particle beams.

This is illustrated in FIG. 1 which discloses Bragg peaks from three different particle beams.

Figure 2:
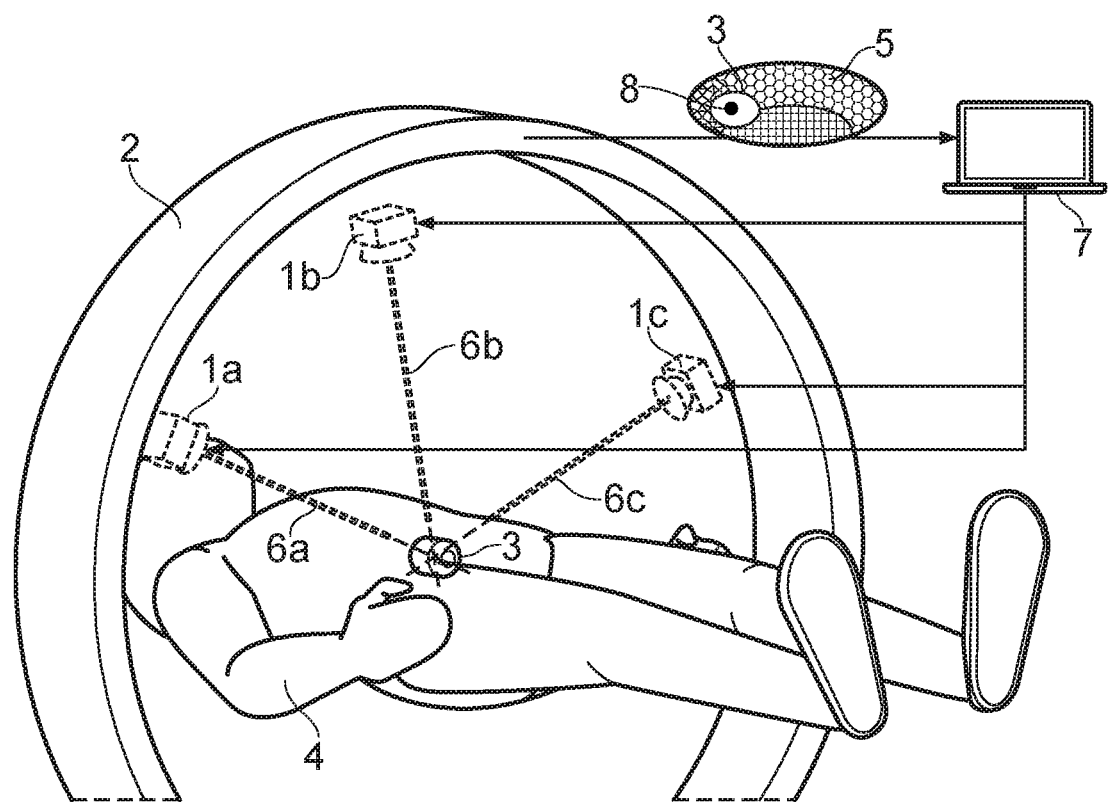
FIGS. 2 and 3 show an embodiment of a radiotherapy system according to the invention.
Figure 3:
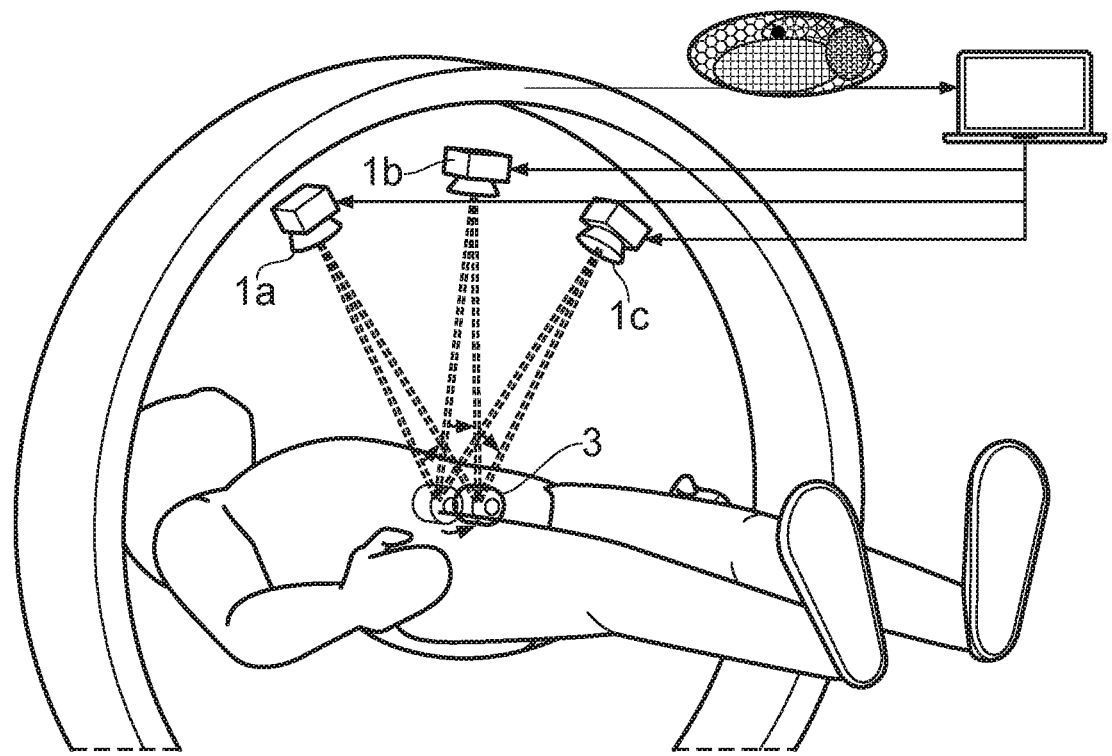

FIGS. 2 and 3 disclose an embodiment of a radiotherapy system according to the invention. The radiotherapy system comprises a plurality of particle beam guiding systems 1a-1c which are arranged to radiate particle beams 6a-6c on a three-dimensional radiation target 3 located inside the body of a radiotherapy patient 4.

The radiotherapy system also comprises a particle beam control system 7 which is arranged to individually control and adjust the energy levels and the trajectories of the particle beams 6a-6c exiting the particle beam guiding systems 1a-1c so that the Bragg peaks of the particle beams 6a-6c are brought to intersect in a predetermined beam intersect region 8 inside the three-dimensional radiation target 3 during a radiation treatment session.

The exit trajectory control comprises controlling three variables defining the position of each particle beam source, e.g. represented by Cartesian coordinates x, y, y, and two variables defining the pith and yaw of the particle beam originating from the beam source, e.g. as represented by angles of rotation measured about orthogonal pitch and yaw axes.

Adjusting the exit energy level of the particle beams 6a-6c may comprise dynamically inserting and removing one or a plurality of attenuator elements (see FIG. 4) in the path of the particle beam 6a-6c.

The radiotherapy system further comprises an imaging system 2 which is arranged to monitor the position and orientation in space of the three-dimensional radiation target 3, and also to monitor tissue characteristics of body tissue 5 surrounding the three-dimensional radiation target 3 located in the radiation paths of the particle beams 6a-6c. Based on the monitored data, the imaging system 2 is arranged to dynamically map the three-dimensional radiation target 3 and the surrounding body tissue 5 and construct a mathematical model representing the relevant part of the patient's body, i.e. the three-dimensional radiation target 3 and the surrounding body tissue 5 lying between the three-dimensional radiation target 3 and the particle beam guiding systems 1a-1c. In this mapping, different types of surrounding tissue (bone, flesh, organs, etc.) are mapped and known information on how the different types of tissue interact with the particle beams is used to produce the mathematical model, in particular information on how much different types of tissue attenuate the particle beams.

In operation, the imaging system 2 monitors the position and orientation in space of the three-dimensional radiation target 3 and surrounding body tissue 5, and continuously updates the map of the three-dimensional radiation target 3 and the surrounding body tissue 5 and as well as the mathematical model representing the relevant part of the body of the patient 4. The updated map and/or the updated mathematical model is forwarded to the particle beam control system 7.

The particle beam control system 7 processes the information received from the imaging system 2 and, based on this information, produces control signals which are sent to the particle beam guiding systems 1a-1c to adjusts the exit energy levels and the exit trajectories of the particle beams 6a-6c so that the Bragg peaks of the particle beams 6a-6c are maintained within the intended beam intersect region 8, taking into account any change of position and/or attitude of the target 3.

This is illustrated in FIG. 3, where a change in position and/or orientation in space of the target 3, e.g. due to the patient or internal organs of the patient moving, prompts the particle beam control system 7 to adjust the exit energy levels and the exit trajectories of the particle beams 6a-6c.

From the information received from the imaging system 2, the particle beam control system 7 also identifies body tissue which, according to the treatment plan, shall not be exposed to the particle beams 6a-6c. When adjusting the exit energy levels and the exit trajectories of the particle beams 6a-6c, the particle beam control system 7 ensures that such body tissue is not exposed to the particle beams 6a-6c.

Adjustment of the exit energy levels and the exit trajectories of the particle beams 6a-6c may not necessarily be triggered by a movement of the radiation target but may be triggered by a movement causing body tissue not to be exposed to the particle beams 6a-6c to be brought into the radiation paths of the particle beams 6a-6c. For example, a rotation of the patient's body leaving the radiation target essentially in the same location in space, may nevertheless require the exit energy level and the exit trajectory of one or a plurality of the particle beams 6a-6c to be adjusted if the rotation brings body tissue not to be irradiated into the radiation path of a particle beam 6a-6c.

If the particle beam control system 7 cannot find a "safe" radiation path for a particle beam 6a-6c, i.e. a radiation path avoiding body tissue not to be exposed to the particle beams, the particle beam control system 7 may have to shut down the particle beam until such a radiation path is found, e.g. until the radiation target and surrounding tissue are shifted so that such a radiation path becomes available again.

The intended beam intersect region 8 may be locked to a given position in the three-dimensional radiation target 3, as is disclosed in FIGS. 2 and 3. Alternatively, the beam intersect region 8 may be arranged to sweep over the three-dimensional radiation target 3, continuously or stepwise, in which case the beam control system 7 must also take into account the new position of the beam intersect region when adjusting the exit energy levels and an exit trajectories of the particle beams 6a-6c in addition to compensating for any change in position and/or orientation in space of the target and for any change in the composition of the tissue lying in the paths of the particle beams 6a-6c.

Figure 4:
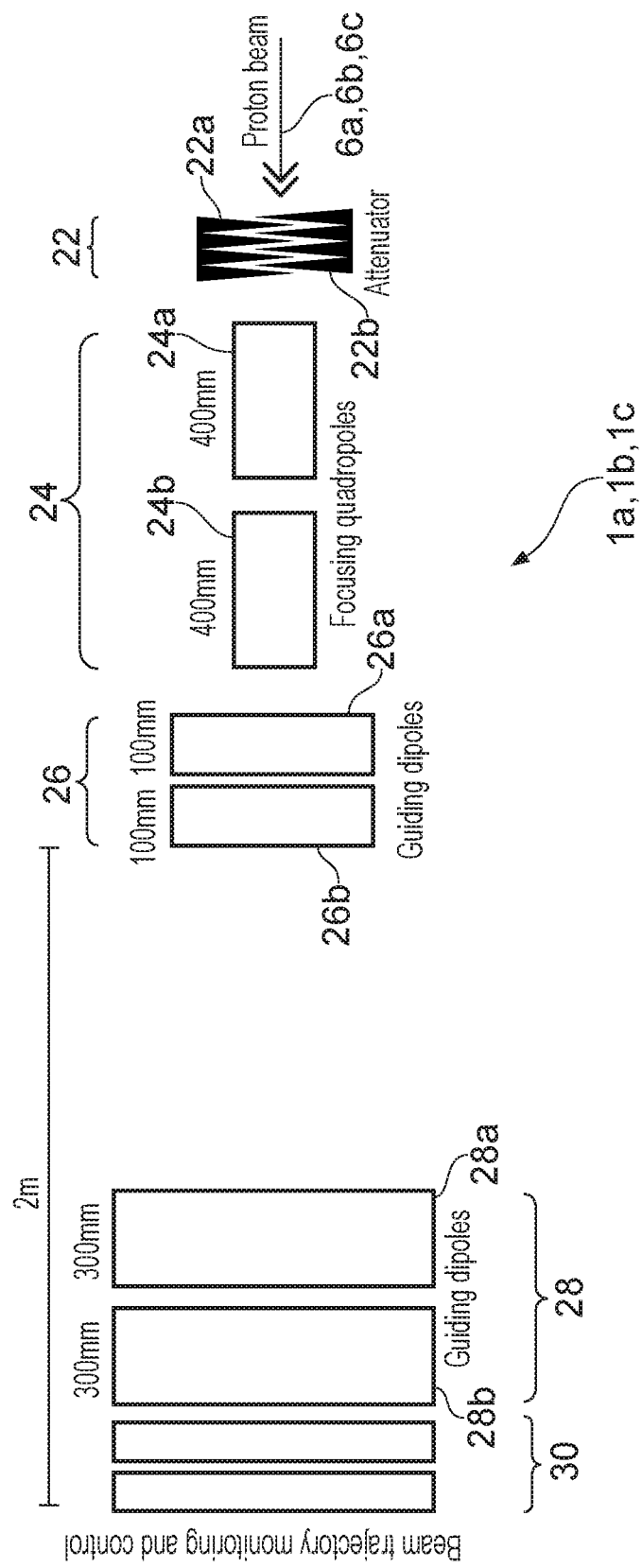
FIGS. 4 and 5 shows schematically a particle beam guiding system according to the invention.
Figure 5:
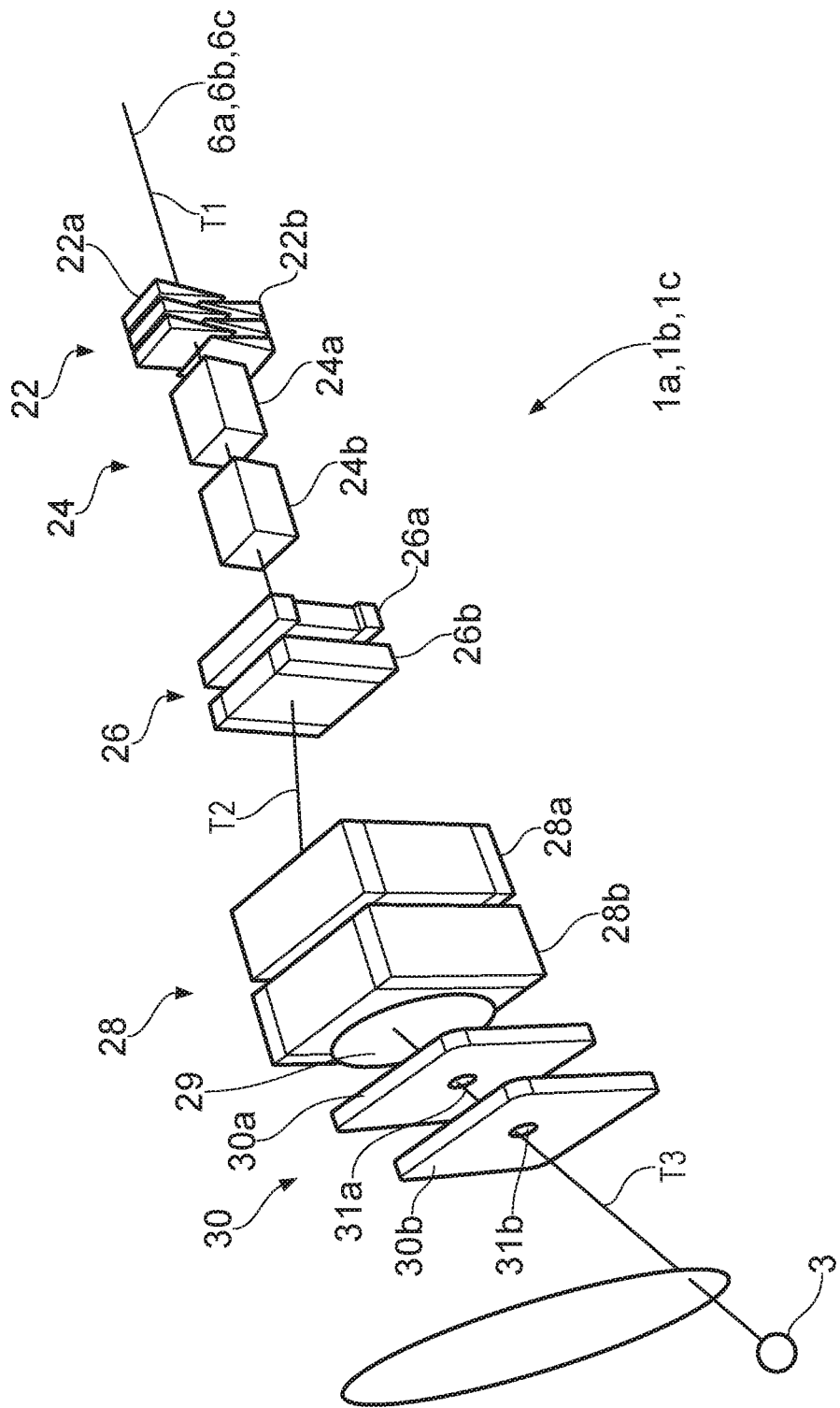

FIGS. 4 and 5 show an embodiment of a particle beam guiding system 1a, 1b, 1c for repositioning and realigning the particle beams 6a, 6b, 6c of the radiotherapy system, wherein the particle beam guiding system 1a-1c is arranged for receiving an incoming particle beam 6a-6c along an incoming trajectory T1 and controlling an exit energy level and an exit trajectory T3 of the particle beam 6a-6c.

The particle beam guiding system 1a-1c comprises, at the end of the system 1a-1c facing away from the radiation target 3, an attenuator 22, which is arranged for adjusting the particle beam energy level so that the Bragg peak occur at the determined point in the three-dimensional radiation target 3. In the disclosed embodiment, the attenuator 22 comprises a pair of sliding wedges 22a, 22b which can be moved towards or away from each other in order to increase or decrease the amount of attenuating material that is in the path of the particle beam 6.

The particle beam guiding system 1a-1c also comprises a focusing unit 24 is arranged downstream of the attenuator 22, i.e. on the radiation target side of the attenuator 22. The focusing unit 24 comprises a set of magnets 24a, 24b forming focusing quadrupoles for focusing the particle beam 6a-6c after it has passed the attenuator 22.

The particle beam guiding system 1a-1c further comprises a first beam guide 26 positioned downstream of the attenuator 22. The first beam guide 26 comprises first and second guiding dipoles 26a, 26b, and each guiding dipoles 26a, 26b comprises two superconductive magnets for creating magnetic fields for deflecting the particle beam 6a-6c from the incoming trajectory T1 into an intermediate trajectory T2, wherein the first dipole 26a is arranged to deflect the particle beam 6a-6c in a first plane, e.g. in the horizontal plane, and the second dipole 26b is arranged to deflect the particle beam 6a-6c in a second plane which is orthogonal to the first plane, e.g. in the vertical plane.

The particle beam guiding system 1a-1c further comprises a second beam guide 28 positioned downstream of the first beam guide 26. The second beam guide 28 comprises first and second guiding dipoles 28a, 28b, each comprising two superconductive magnets. The guiding dipoles 28a, 28b are arranged to deflect the particle beam 6a-6c from the intermediate trajectory T2 into the exit trajectory T3. As in the first beam guide 26, one dipole 28a is arranged deflect the particle beam 6a-6c in a first plane, and the other dipole 28b is arranged to deflect the particle beam 6a-6c in a second plane which is orthogonal to the first plane.

The first beam guide 26 is able to deflect the incoming beam 6a-6c so that it enters the second beam guide 28 of-centre, i.e. along a trajectory which is non-parallel to the incoming trajectory T1. This will enable the particle beam 6a-6c to exit the second beam source 28 from anywhere within a planar circular area 29 being orthogonal to the incoming trajectory T1 and having a centre which is coaxial with the incoming trajectory T1 (see FIG. 5). The maximum deflection possible, i.e. defining the radius of circular area 29, will be determined by the strength and extent of the magnets of the first beam guide as well as by how energetic the particle beam is.

The second beam guide 28 controls the alignment by which the particle beam 6a-6c exits the second beam guide 28. In other words, the second beam guide 28 controls the pitch and yaw of the exit trajectory T3.

Consequently, the first beam guide 26 controls the starting position of the exit trajectory T3 (within the circle 29), and the second beam guide 28 controls the pitch and yaw of the exit trajectory T3, thus allowing the particle beam guiding system 1a-1c to adopt the exit trajectory T3 to the position of the radiation target and surrounding tissue.

Figure 6:
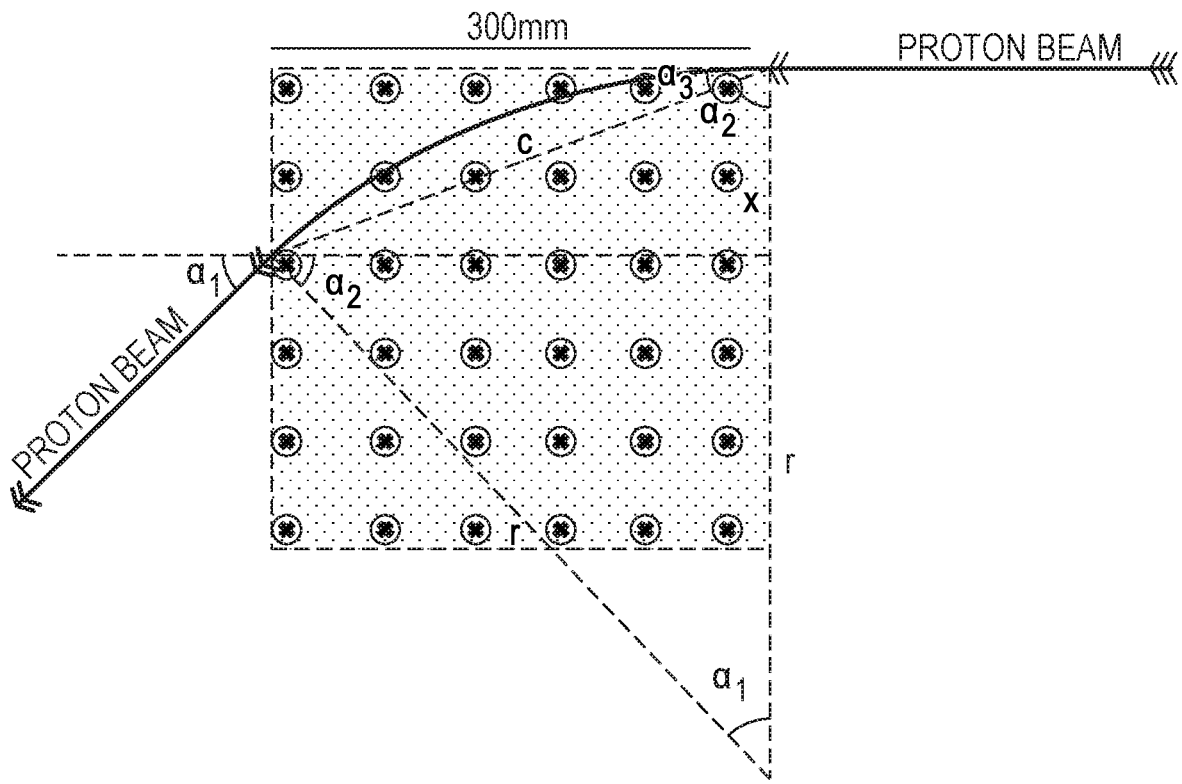
FIG. 6 illustrates particle beam bending.
Figure 7A:
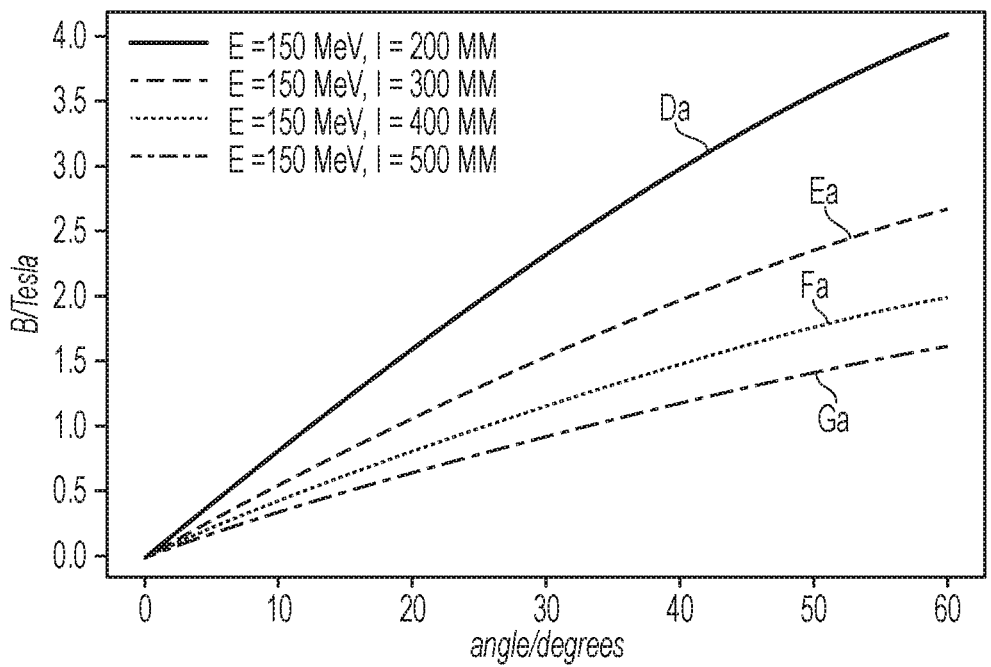
FIGS. 7a and 7b show angle of bending as a function of applied magnetic field in a particle beam guiding subsystem.
Figure 7B:
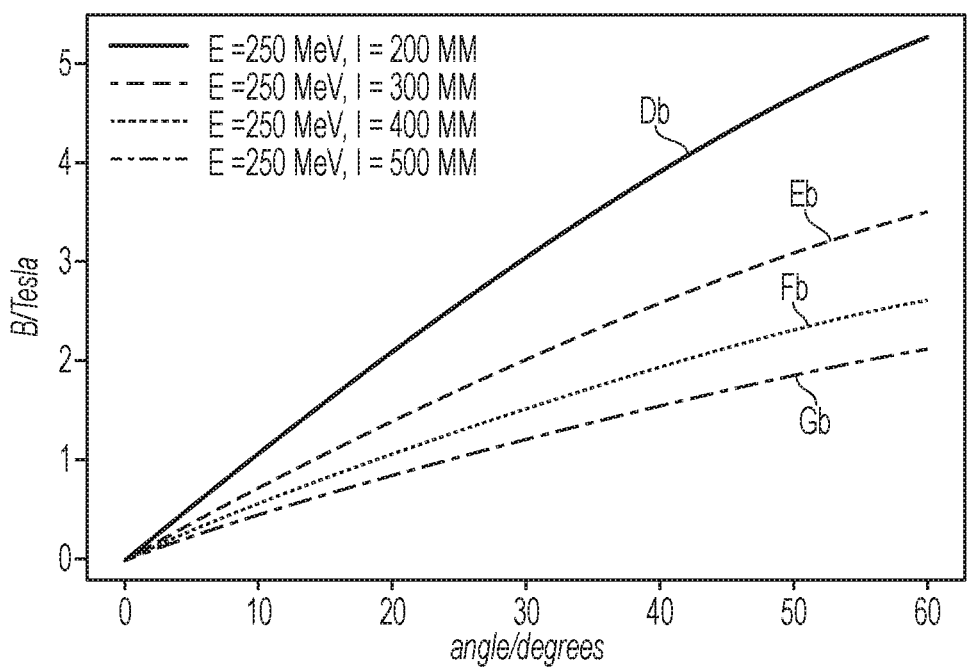

FIG. 6 shows the general principle of how a charged particle, e.g. a proton, obtains a new direction when passing through a magnetic field, and FIGS. 7a and 7b show the angle of bending achieved in the first beam guide 26 as a function of applied magnetic field strength for different lengths of the magnetic field, l, in particular for l=200 mm (curves Da, Db), l=300 mm (curves Ea, Eb), l=400 mm (curves Fa, Fb) and l=500 mm (curves Ga, Gb). FIG. 7a shows the angle of bending achieved for a particle beam having an energy of 150 MeV and FIG. 7b shows the angle of bending achieved for a particle beam having an energy of 250 MeV.

Downstream of the second beam guide 28, the particle beam guiding system 1a-1c comprises a beam trajectory monitoring and control unit 30. This unit 30 comprises two parallel beam trajectory control disks 30a, 30b which are individually movable in individual planes which are orthogonal to the incoming trajectory. The distance between the control disks 30a, 30b is within the range of 40 to 150 mm. Each control disk 30a, 30b, displays a circular opening 31a, 31b for the particle beam to pass through, the openings 31a, 31b each having a diameter which is slightly larger than the diameter of the particle beam 6a-6c. The diameter of the openings 31a, 31 may for example be within the range of 3 to 10 mm.

In operation, the first and second beam trajectory control disks 30a, 30b are positioned so that the openings 31a, 31b define a desired exit trajectory of the particle beam guiding system. If the first and second beam guides 26, 28 have succeeded in achieving the exit trajectory set by the particle beam control system 7, the particle beam will pass through the aligned openings 31a, 31b. However, if the beam guides 26, 28 have misaligned the particle beam, the particle beam will hit the first or second control disk.

Consequently, the openings 31a, 31b will at all times be kept in a position which allows a particle beam having the desired exit trajectory to pass through the openings 31a, 31b, thus acting as a safety measure to ascertain that the particle beam does not hit any other position than the specified target area. Each of the beam trajectory control disks 30a, 30b has a surface which absorbs any stray protons, plus sensors for registration of the amount of stray protons, thus allowing information on the misalignment to be fed back to the particle beam guiding system allowing it to adjust, in real time or in near real time, the attenuator and/or the beam guides to reduced deviation between desired and detected exit trajectory.

This functionality may be improved over time through computed learning. This functionality is obtained without interfering with the main particle beam.

The particle beam guiding system 1a-1c comprises a chamber (not shown) in which the components of the particle beam guiding system is enclosed. The chamber provides atmospheric control, e.g. a vacuum enclosure and/or temperature control, to ensure cryogenic cooling. The chamber also provides magnetic shielding, preventing the magnetic fields from one particle beam guiding system from interfering with the operation of another particle beam guiding system.

In the preceding description, various aspects of the apparatus according to the invention have been described with reference to the illustrative embodiment. For purposes of explanation, specific numbers, systems and configurations were set forth in order to provide a thorough understanding of the apparatus and its workings. However, this description is not intended to be construed in a limiting sense. Various modifications and variations of the illustrative embodiment, as well as other embodiments of the apparatus, which are apparent to persons skilled in the art to which the disclosed subject matter pertains, are deemed to lie within the scope of the present invention a defined by the following claims.

The invention claimed is:

1. A particle beam guiding system for receiving a particle beam along an incoming trajectory and controlling an exit energy level and an exit trajectory of the particle beam, wherein the particle beam guiding system comprising:
    an attenuator for adjusting the exit energy level of the particle beam;
    a first beam guide positioned downstream of the attenuator, comprising a first guiding dipole and a second guiding dipole, each guiding dipole comprising two magnets for creating magnetic fields for deflecting the particle beam from the incoming trajectory into an intermediate trajectory, wherein the first guiding dipole of the first beam guide is arranged to deflect the particle beam in a first plane, and the second guiding dipole of the first beam guide is arranged to deflect the particle beam in a second plane, which is orthogonal to the first plane;
    a second beam guide positioned downstream of the first beam guide, comprising a first guiding dipole and a second guiding dipole, each guiding dipole comprising two magnets for creating magnetic fields for deflecting the particle beam from the intermediate trajectory into the exit trajectory, wherein the first guiding dipole of the second beam guide is arranged to deflect the particle beam in a third plane, and the second guiding dipole of the second beam guide is arranged to deflect the particle beam in a fourth plane, which is orthogonal to the third plane; and
    a beam trajectory monitoring and control unit positioned downstream of the second beam guide, and arranged for controlling an alignment of the particle beam emerging from the second beam guide, wherein the beam trajectory monitoring and control unit comprises a first beam trajectory control disk and a second beam trajectory control disk having a particle beam attenuating material, each beam trajectory control disk being individually movable in an individual parallel plane, which is orthogonal to the incoming trajectory, and each beam trajectory control disk displaying an opening, an alignment of which opening defines the exit trajectory.

2. The particle beam guiding system according to claim 1, further comprising:
an intermediate gap, wherein the first beam guide and the second beam guide are arranged with the intermediate gap, and wherein the intermediate gap between the first beam guide and the second beam guide being within a range of 30 to 150 cm.

3. The particle beam guiding system according to claim 1, further comprising:
a focusing unit positioned downstream of the attenuator and upstream of the first beam guide, the focusing unit comprising a set of magnets forming focusing quadrupoles for focusing the particle beam.

4. The particle beam guiding system according to claim 1, wherein the attenuator comprises:
a pair of sliding wedges, which can be moved towards or away from each other in order to increase or decrease an amount of an attenuating material in a path of the particle beam.

5. The particle beam guiding system according to claim 1, wherein the two magnets of the first beam guide and the second beam guide comprise superconductive magnets.

6. A method of controlling, in a particle beam guiding system, an exit energy level and an exit trajectory of a particle beam, the method comprising the steps of:
receiving, in the particle beam guiding system, a particle beam along an incoming trajectory;
adjusting the exit energy level of the particle beam in an attenuator of the particle beam guiding system;
deflecting the particle beam from the incoming trajectory into an intermediate trajectory using a first beam guide of the particle beam guiding system positioned downstream of the attenuator, the first beam guide comprising a first guiding dipole and a second guiding dipole, each guiding dipole comprising two magnets for creating magnetic fields for deflecting the particle beam from the incoming trajectory into the intermediate trajectory, wherein the first guiding dipole of the first beam guide is arranged for deflecting the particle beam in a first plane, and the second guiding dipole of the first beam guide is arranged for deflecting the particle beam in a second plane, which is orthogonal to the first plane;
deflecting the particle beam from the intermediate trajectory into the exit trajectory using a second beam guide of the particle beam guiding system positioned downstream of the first beam guide, the second beam guide comprising a first guiding dipole and a second guiding dipole, each guiding dipole comprising two magnets for creating magnetic fields for deflecting the particle beam from the intermediate trajectory into the exit trajectory, wherein the first guiding dipole of the second beam guide is arranged for deflecting the particle beam in a third plane, and the second guiding dipole of the second beam guide is arranged for deflecting the particle beam in a fourth plane, which is orthogonal to the third plane; and
controlling an alignment of the exit trajectory using a beam trajectory monitoring and control unit of the particle beam guiding system positioned downstream of the second beam guide, wherein the beam trajectory monitoring and control unit comprises a first beam trajectory control disk and a second beam trajectory control disk of a particle beam attenuating material, each beam trajectory control disk being individually movable in an individual parallel plane, which is orthogonal to the incoming trajectory, and each beam trajectory control disk displaying an opening, an alignment of which opening defines the exit trajectory.

7. The method according to claim 6, further comprising the step of: focusing the particle beam using a focusing unit of the particle beam guiding system positioned downstream of the attenuator of the particle beam guiding system and upstream of the first beam guide, wherein the focusing unit comprises a set of magnets forming focusing quadrupoles for focusing the particle beam.

8. The method according to any one of claims 6 and 7, wherein the step of adjusting the exit energy level of the particle beam in the attenuator of the particle beam guiding system comprises:
moving a pair of sliding wedges in the attenuator of the particle beam guiding system towards or away from each other in order to increase or decrease an amount of an attenuating material in a path of the particle beam.

* * * * *